United States Patent
Miyajima et al.

(10) Patent No.: US 7,917,269 B2
(45) Date of Patent: Mar. 29, 2011

(54) VEHICLE VERTICAL ACCELERATION CONTROL SYSTEM

(75) Inventors: Takayuki Miyajima, Okazaki (JP); Fumiharu Ogawa, Okazaki (JP)

(73) Assignee: Aisin AW Co., Ltd. (JP)

( * ) Notice: Subject to any disclaimer, the term of this patent is extended or adjusted under 35 U.S.C. 154(b) by 989 days.

(21) Appl. No.: 11/590,836

(22) Filed: Nov. 1, 2006

(65) Prior Publication Data
US 2007/0100532 A1    May 3, 2007

(30) Foreign Application Priority Data
Nov. 1, 2005 (JP) ................................ 2005-318248

(51) Int. Cl.
*G06F 19/00* (2006.01)
(52) U.S. Cl. ........... 701/70; 702/141; 702/142; 340/466; 340/467
(58) Field of Classification Search ............... 701/93–96, 701/211, 220, 70; 123/350; 180/170; 73/178 R; 318/580; 702/141–142; 340/466–467
See application file for complete search history.

(56) References Cited

U.S. PATENT DOCUMENTS

| | | | | |
|---|---|---|---|---|
| 4,515,221 | A * | 5/1985 | van der Lely | 172/3 |
| 6,052,644 | A | 4/2000 | Murakami et al. | 701/93 |
| 6,199,001 | B1 | 3/2001 | Ohta et al. | 701/51 |
| 6,253,143 | B1 | 6/2001 | Silvernagle et al. | 701/93 |
| 7,239,953 | B2 * | 7/2007 | Braunberger et al. | 701/70 |
| 7,680,573 | B2 * | 3/2010 | Ogawa | 701/37 |
| 2004/0094912 | A1 | 5/2004 | Niwa et al. | 280/5.518 |
| 2007/0100532 | A1 * | 5/2007 | Miyajima et al. | 701/95 |
| 2007/0198183 | A1 * | 8/2007 | Morimoto et al. | 701/211 |

FOREIGN PATENT DOCUMENTS

| | | |
|---|---|---|
| DE | 102 05 039 | 8/2003 |
| GB | 2 357 159 | 6/2001 |
| JP | 8-188026 | 7/1996 |
| JP | 10-299890 | * 11/1998 |
| JP | 2000-318634 | 11/2000 |
| JP | 2001-065678 | 3/2001 |
| JP | 2004-317138 | 11/2004 |
| JP | 2004-332296 | 11/2004 |
| JP | 2005-318248 | 11/2006 |

* cited by examiner

*Primary Examiner* — Cuong H Nguyen
(74) *Attorney, Agent, or Firm* — Bacon & Thomas, PLLC

(57) ABSTRACT

A vehicle control system is provided that improves the riding comfort by decelerating before a level change, even when the speed of the vehicle is high, through deceleration control when a characteristic value, that represents the relationship between the speed and the vertical acceleration of a vehicle, exceeds a comfort demarcation line that indicates a critical value of comfort in passing over the level change. The vehicle control system includes a memory that stores level change information for level changes in a road; a vehicle speed detector; and a vehicle speed controller that calculates the characteristic value based on the detected vehicle speed and the level change information, and executes acceleration control when the calculated characteristic value exceeds the critical value of comfort.

11 Claims, 14 Drawing Sheets

VEHICLE VERTICAL ACCELERATION CONTROL SYSTEM

CROSS-REFERENCE TO RELATED APPLICATIONS

Subject matter related to the invention described and claimed herein is described and claimed in copending application Ser. No. 10/669,625 filed Sep. 25, 2003.

INCORPORATION BY REFERENCE

The present application claims priority, under 35 USC 119, of Japanese Patent Application No. 2005-318248 filed on Nov. 1, 2005, the teachings of which, including the specification, drawings and abstract, are incorporated herein by reference in their entirety.

BACKGROUND OF THE INVENTION

1. Field of the Invention

The present invention relates to a vehicle control system.

2. Description of the Related Art

The combination, in a vehicle, of a navigation apparatus and suspension control apparatus to enable control of the suspension in accordance with road condition data provided by the navigation apparatus is disclosed, for example, in Japanese Patent Application Publication ("kokai") No. JP-A-2000-318634. In such a vehicle control system, changes in level of the toad stored in a database are used to control the rigidity of the suspension.

However, in the conventional suspension control apparatus described in kokai 2000-318634 wherein the suspension is softened when passing over level changes, e.g. bumps, when the vehicle speed is high, it has been possible to provide sufficient riding comfort. The vertical acceleration that occurs when the vehicle passes over a level change is determined by the magnitude (size) of the level change and the vehicle speed, and thus, for the same level change, the vertical acceleration becomes higher as the vehicle speed becomes higher. In addition, because there are limits to the range in which the rigidity of the suspension can be controlled, even when the suspension is made as soft as possible, when the vehicle speed is high, it is possible to suitably absorb this vertical acceleration, and the riding comfort suffers.

SUMMARY OF THE INVENTION

In order to solve the foregoing problem, it is an object of the present invention to provide a vehicle control system that, when passing over a level change, enables improvement in the riding comfort, even when the speed of the vehicle is high, by decelerating before reaching the level change by execution of deceleration control when a characteristic value, that represents the relationship between the speed and the vertical acceleration of the vehicle, exceeds a critical comfort value.

Thus, the vehicle control system of the present invention includes a memory device that stores level change information for level changes in roads; a vehicle speed detecting device that detects the speed of the vehicle; and a vehicle speed control device that calculates a characteristic value representing the relationship between the speed and the vertical acceleration of the vehicle based on (1) the speed of the vehicle that has been detected by the vehicle speed detecting device and (2) the level change information, and executes deceleration control when the calculated characteristic value exceeds a critical comfort value.

According to the present invention, when the characteristic value indicating the relationship between the speed and the vertical acceleration of the vehicle will exceed a critical value when passing over a level change, deceleration control is executed and, even in the case in which the speed of the vehicle is high, it is possible to improve the riding comfort by decelerating before reaching the level change.

DESCRIPTION OF THE PREFERRED EMBODIMENTS

Figure 2:
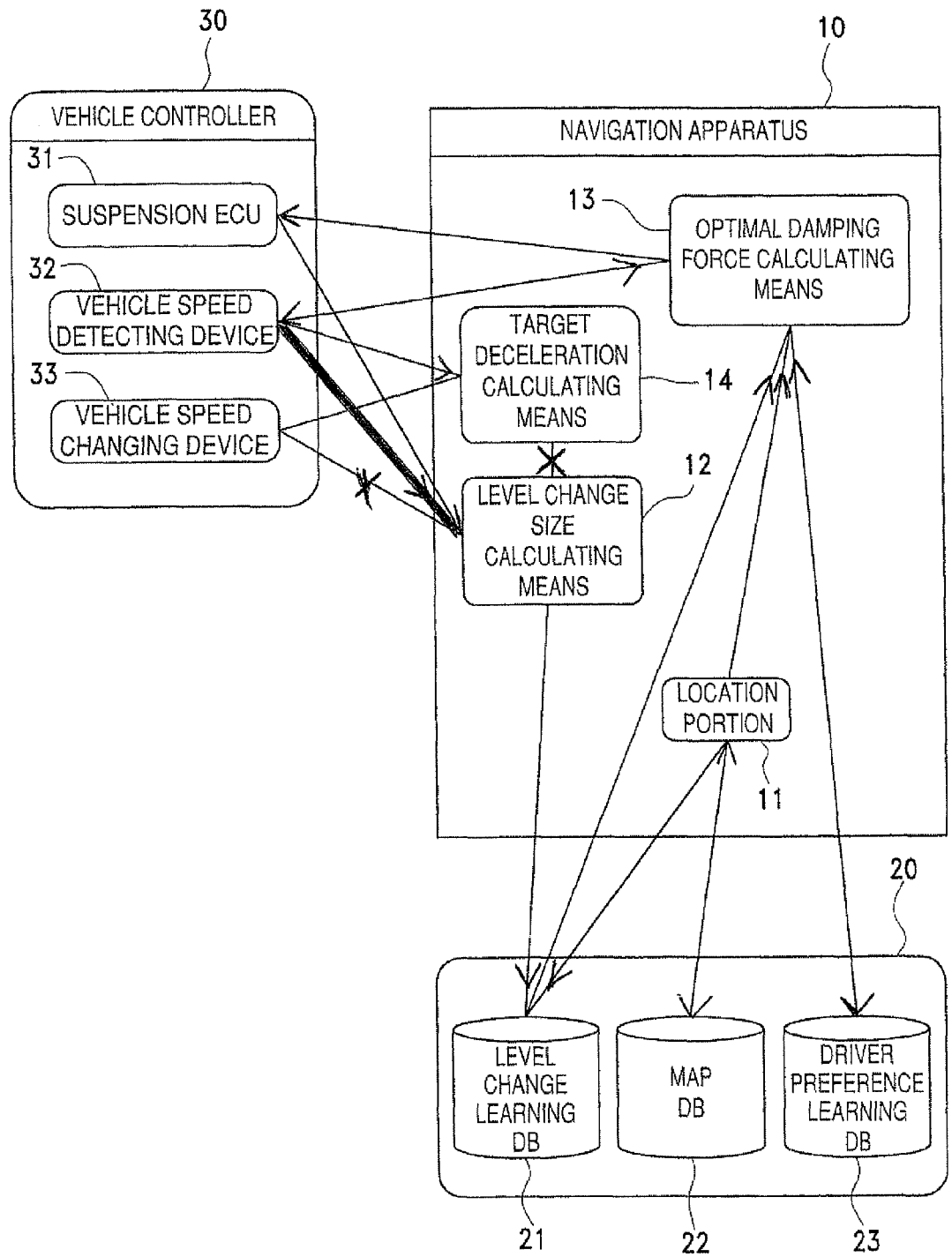
FIG. 2 is a block diagram of a vehicle control system in one embodiment of the present invention.

FIG. 2 is a block diagram of a vehicle control system of one preferred embodiment of the present invention. As is shown in the FIG. 2, the vehicle control system includes a navigation apparatus 10 that outputs travel environment information as road information, a database unit 20 that stores various types of data, and a vehicle controller 30 that is mounted in the vehicle and that detects vehicle operating variables and controls the vehicle, including the vehicle suspension system. The database unit 20 may be integrated into the navigation apparatus 10. The vehicle may be any of several types capable of traveling on a road, such as a passenger car, a truck, a bus, a two-wheeled vehicle or the like. However, in the present embodiment, for the convenience of explanation, the case in which the vehicle is a four wheel passenger car, wherein each wheel is equipped with an independent suspension (suspension system), will be described.

The vehicle controller 30 is shown as including a suspension ECU (Electronic Control Unit) 31, vehicle speed detecting means 32 that serves as a vehicle speed detecting device, and vehicle speed changing means 33. The suspension ECU 31 is an apparatus that controls the characteristics of the suspension, and it is provided with a processor such as a CPU, MPU, or the like, a memory device such as semiconductor memory, a magnetic disc or the like, a communication interface, and the like. The suspension ECU 31 is connected for communication with the navigation apparatus 10 through a communication network such as an in-vehicle LAN (Local Area Network) or the like that is wired into the vehicle. Note that any characteristic of the suspension may be controlled by the suspension ECU 31. For example, the spring rate (or spring constant) of a spring member may be controlled. However, in the embodiment described here, the damping force of the suspension is controlled. In addition, while the control of the damping force may be effected by any conventional means, in the embodiment described here, an actuator is built into the oil pressure damper of each suspension unit, which actuator may be activated to change the size of the diameter of an orifice in the oil flow channel by rotating an orifice, switching-type variable damping valve.

A vertical acceleration sensor that detects the vertical acceleration of the vehicle is also connected for input to the suspension ECU 31. Vertical acceleration here is the acceleration of the upper portion of a spring moving vertically, the upper portion of the spring being the part of the suspension on the vehicle side. Based on signals from the vertical acceleration sensor, it is possible to detect that the vehicle is traveling over a level change, e.g. bump.

The vehicle speed detecting means 32 includes a vehicle speed sensor and, like the suspension ECU 31, is connected for communication with the navigation apparatus 10.

The vehicle speed changing means 33 includes an automatic transmission control apparatus that controls the automatic transmission which adjusts the driving force of the vehicle. The vehicle speed changing means changes the vehicle speed changed by controlling the automatic transmission. The automatic transmission transmits the rotation of the vehicle engine to the axles while controlling the gear ratio, and may be a stepped automatic transmission in which the gear ratio is changed stepwise. However, the present embodiment will be described with reference to a step-less automatic transmission in which the gear ratio is changed continuously. The vehicle speed changing means 33, like the suspension ECU 31 and the vehicle speed detecting means 32, is connected for communication with the navigation apparatus 10.

The navigation apparatus 10 is provided with a processor such as a CPU, MPU, or the like, a memory device such as semiconductor memory, a magnetic disc or the like, a display device such as a CRT, liquid crystal display, LED (Light Emitting Diode) display, a laser hologram, or the like, an input device such as a touch panel, remote control, push button switches or the like, an audio output device such as a loudspeaker or the like, an audio input device such as a microphone or the like, and a communication interface and the like. Furthermore, the navigation apparatus 10 is provided with a GPS (Global Positioning System) sensor, a gyroscopic sensor, or a G sensor or the like, and based on the signals from these sensors and the signals from the vehicle speed detecting means 32, the current position of the vehicle, the vehicle orientation, the vehicle speed, the distance that the vehicle has traveled and the like, can be detected. The navigation apparatus 10 may also be provided with a steering sensor for detecting the steering angle of the vehicle that is manually controlled by the driver, a turn signal sensor for detecting the operation of turn signals that serve as direction indicators for the vehicle, an accelerator sensor that detects the angle of the accelerator pedal as operated by the driver, a brake sensor that detects the movement of the vehicle brake pedal as operated by the driver, a vehicle weight sensor that acquires weight data for the vehicle, a geomagnetism sensor, a distance sensor, a beacon sensor, and/or an altimeter. The GPS sensor detects the current location based on radio signals transmitted by GPS satellites (not illustrated), the geomagnetism sensor detects the vehicle orientation by measuring geomagnetism, and the distance sensor detects the distance between predetermined positions on the road. The beacon sensor detects the current location by receiving position information from beacons that are installed along the road.

The database unit 20 includes a level change learning database 21, a map database 22, and a driver preference learning database 23, and is connected for communication with the navigation apparatus 10. The level change learning database 21, the map database 22, and the driver preference learning database 23 may be stored in a memory device that is built into the navigation apparatus 10.

The map database 22 includes a map data file, an intersection data file, a node data file, a road data file, and a facility data file that stores information about facilities such as hotels, gas stations and the like in each region. The intersection data file stores intersection data, the node data file stores node data, and the road data file stores road data. The road traveled is displayed on the screen of the display device by using the intersection data, node data, and road data. The intersection data includes the types of intersection, that is, whether or the intersection is equipped with traffic signal lights. The node data gives the configuration, at least the location and shape, of roads in the map data that is stored in the map data file, and includes data that shows actual junctions in the road (including intersections, T-junctions, and the like), node points, and links that connect each of the node points. The node points indicate at least the locations of curves in a road.

In addition, the road data includes data for the width, slope, cant, elevation, banking, road surface conditions, the number of lanes, the points where the number of lanes decreases, points where the width narrows, and the like for each road. In the case of expressways and arterials, data sets for traffic lanes in opposing directions are stored as separate roads, and are processed as a double road. For example, in the case of an arterial having two or more lanes on each side, the arterial is processed as two roads, with the inbound lanes and the outbound lanes each stored in the road data as a double road. In addition, the road data includes data for corners, such as the radius of curvature, intersections, T-junctions, corner entrances, and the like. Further included is data for road attributes, such as railroad crossings, expressway entrance ramps, tollbooths for expressways, downhill roads, uphill roads, and the road type (Federal interstate, major state road, general-use road, expressway, and the like).

Additionally, the level change learning database 21 stores level change information such as the location of the learned level changes, the magnitude of the level changes, and the like. In addition, the driver preference learning database 23 stores the preferences of the driver that is the user of the navigation apparatus 10, the data being obtained when the level changes have been encountered and learned. These preferences relate to whether any discomfort was felt when passing over the level changes.

Note that in terms of functionality, the navigation apparatus 10 includes a current location determination section (means) 11, a level change size calculating section (means) 12, an optimal damping force calculating section (means) 13, and a target deceleration calculating section (means) 14. The current location determination section 11 detects the current location of the vehicle by referring to the map database 22, based on the signals from a GPS sensor, a gyroscope sensor, a G sensor, the vehicle speed detecting sensor 32 and the like. In addition, the level change magnitude calculating section 12 calculates the size or magnitude of a level change, based on the speed that is detected by the vehicle speed detecting means 32 when passing over the level changes, and the vertical acceleration of the vehicle that is detected by the vertical acceleration sensor. Furthermore, the optimal damping force calculating section 13 calculates the optimal damping force of the suspension for passing over a level change when the vehicle is approaching a level change that has been previously learned. The suspension ECU 31 controls the damping force of the suspension based on the damping force calculated by the optimal damping force calculating section 13. In addition, the target deceleration calculating section 14 calculates a target deceleration, which is the deceleration necessary to attain the recommended vehicle speed before reaching a level change, when the vehicle speed is higher than the recommended speed for the vehicle to pass over the level change. The vehicle speed changing means 33 controls the gear ratio of the automatic transmission so as to attain the target deceleration that has been calculated by the target deceleration calculating section 14.

In addition, like the typical automobile navigation apparatus, the navigation apparatus 10 executes basic processes such as searching for a route to a destination, in-route travel guidance, and searching for sites, facilities, and the like. The navigation apparatus 10 also displays maps on the screen of a display device and displays the current location of the vehicle on the map, the route from the current location to the destination, and guidance information along the route. The guidance information may also be output by audio using an audio device.

In the present embodiment, in terms of functionality, the vehicle control system includes a level change detector, a memory, a level change controller, and a vehicle speed controller. The level change detector detects level changes in the road and provides the functions of a vertical acceleration sensor, level change magnitude calculating means 12, and the like. The memory stores the level change information for level changes that have been detected by the level change detecting device, and functions as the learned level change database 21 and the like. Furthermore, the level change controller provides level change control based on the level change information for level changes that is stored in the memory, and functions as the optimal damping force calculating means 13, suspension ECU 31, and the like. Furthermore, the vehicle speed controller controls deceleration by changing the gear ratio of the automatic transmission, and includes such functions as the target deceleration calculating means 14, the vehicle speed detecting means 32, and the vehicle speed changing means 33.

Next, the operation of the vehicle control system having the configuration described above will be explained with reference to FIGS. 1 and 3. First, the operation by which level changes are learned will be explained.

When the vehicle travels over a level change, e.g. dump, on the road, it is possible to improve the riding comfort by changing the characteristics of the suspension to a soft (yielding) setting by, for example, reducing the damping force. However, because there is not sufficient time to change the characteristics of the suspension beginning at the time that a level change is detected, it has been possible to obtain a sufficient benefit. Thus, in order to obtain a sufficient benefit, it is necessary to change the characteristics of the suspension to a soft (yielding) setting beforehand. Storing level change information in advance in the map database 22 and determining that there is a level change within a predetermined distance forward of the vehicle, based on this level change information and the current location of the vehicle, allows change of the characteristics of the suspension in advance. However, creating the map data files and road data files that store level change information related to all of the level changes in a road is expensive, and because the memory capacity necessary for storing such files would be enormous, this is in practice very difficult. Further, while detecting level changes within a predetermined distance forward of the vehicle by an image-pickup apparatus such as a camera or a radar apparatus such as a millimeter wave radar attached to the vehicle is theoretically possible, the cost of such detecting of level changes with high precision is high.

Thus, in the embodiment of the present invention, when the navigation apparatus 10 detects the presence of a level change and the magnitude of the level change, based on the vertical acceleration of the vehicle that has been detected by the vertical acceleration sensor and the vehicle speed that has been detected by the vehicle speed detecting means 32, the level change information for the detected level change is stored in the learned level change database 21. The level change information includes the location of the level change, the magnitude of the level change, and the like.

Figure 1:
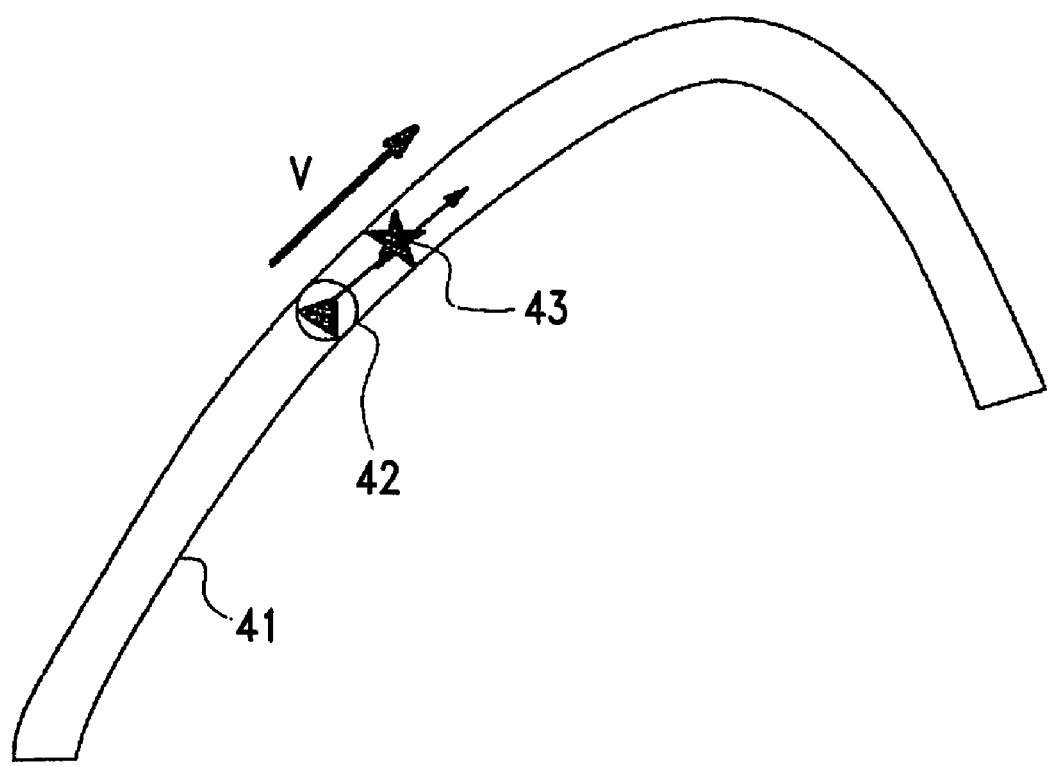
FIG. 1 illustrates learning of level changes in an embodiment of the present invention.

FIG. 1 illustrates the learning of level changes. In FIG. 1 a road outline 41 indicates the shape of the road, a current location mark 42 indicates the current location of the vehicle, a level change mark 43 indicates the location of the level change, and V denotes the vehicle speed. First the navigation apparatus 10 determines whether or not there is map matching using the current location determination section 11 to compare the current location of the vehicle that has been detected based on signals from a GPS sensor, a gyroscopic sensor, a G sensor, the vehicle speed detecting means 32 or the like, with the map data stored in the map database 22. Next, when the detected current location of the vehicle is on a road in the map data, it is determined that there is no matching and execution of the learning routine is terminated.

If matching is determined when the detected current location of the vehicle is on a road in the map data, the navigation apparatus 10 then determines whether or a level change has been detected. As shown in FIG. 1, it is determined whether or the vehicle has passed over a level change while traveling along the road. This determination that the vehicle is passing over a level change is based on detection of a high frequency component of the vertical acceleration of the vehicle, by the vertical acceleration sensor, that is equal to or greater than a predetermined threshold value. Conversely, when the high frequency component of the vertical acceleration is less than a predetermined threshold value, it is determined that the vehicle has passed over a level change and execution of the routine is terminated.

When the high frequency component of the vertical acceleration is equal to or greater than the predetermined threshold, the navigation apparatus 10 determines that the vehicle has passed over a level change, and the level change magnitude calculating means 12 calculates the magnitude of the level change from the vehicle speed V and the damping force of the suspension when the vehicle passed over the level change. The magnitude of the level change can be calculated based on the vehicle speed V and the detected vertical acceleration when the vehicle passes over the level change, in accordance with a predetermined (known) relationship between the magnitude of the level change found in advance, the damping force of the suspension, the vehicle speed, and the vertical acceleration.

Next, the navigation apparatus 10 stores the current location and the magnitude of level change in the learned level change database 21, and ends execution of the learning routine. In this case, the current location when the level change was detected is stored as the level change location, along with the magnitude of level change that has been calculated by the level change magnitude calculating section 12. Specifically, the coordinates of the location of the level change and the magnitude of the level change are correlated, and are stored in the learned level change database 21. The level change that the vehicle has passed over is thereby learned.

The learning routine described above is repeatedly executed at a predetermined interval, for example, once every 10 msec. Thus, the location and magnitude of each level change that the vehicle has passed over while traveling are stored in sequence and are accumulated.

Figure 3:
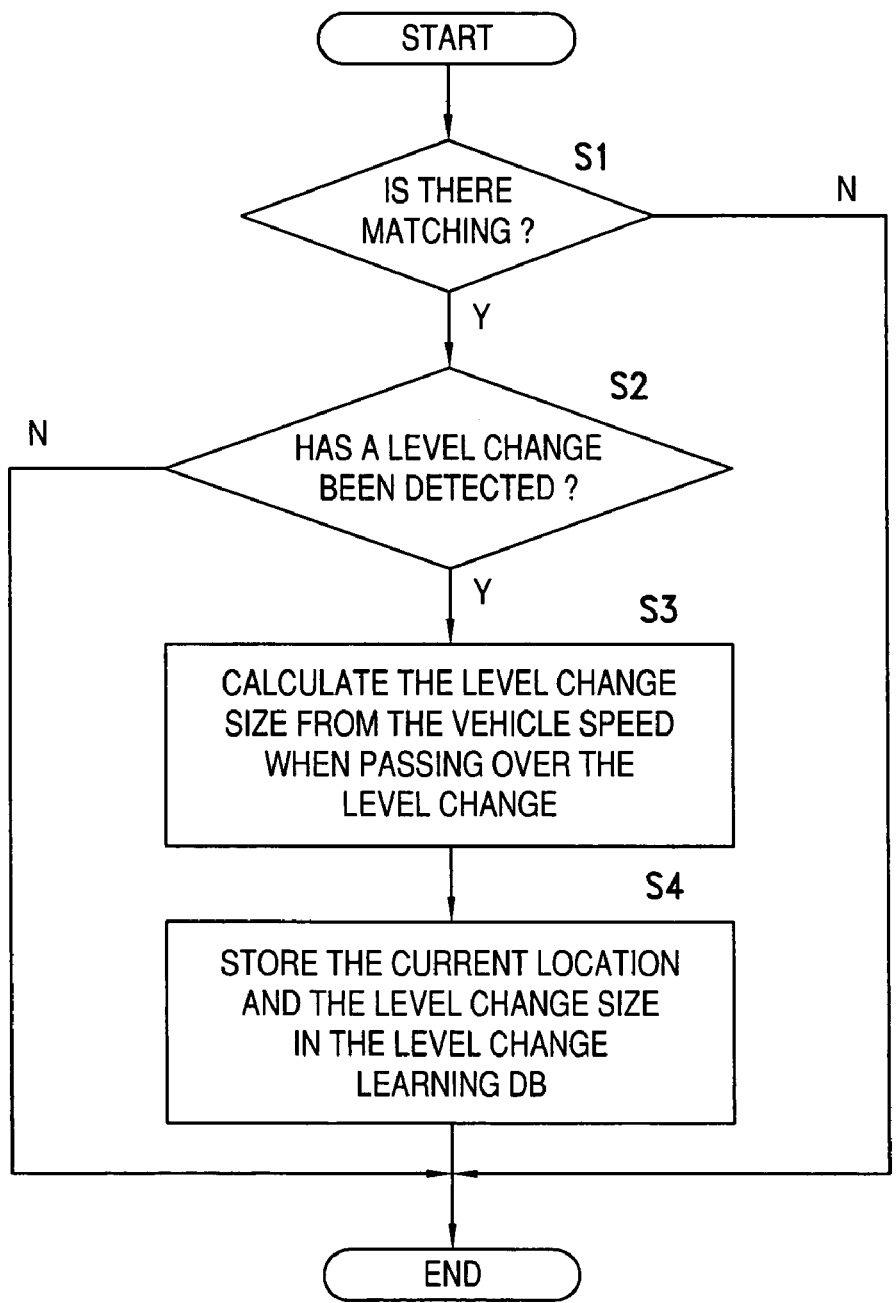
FIG. 3 is a flowchart of a learning routine for creation of a learned level change database in an embodiment of the present invention, including learning of level changes.

Next, the flowchart of FIG. 3 (learning routine) will be explained.

Step S1: It is determined whether or there is matching. When there is matching, execution of the routine proceeds to step S2, and when there is no matching, the execution is ended.

Step S2: It is determined whether or a level change has been detected. When a level change has been detected, the execution of the routine proceeds to step S3, and when a level change has been detected, execution of the routine is ended.

Step S3: The magnitude of the level change is calculated from the vehicle speed when vehicle passes over a level change.

Step S4: The current location and the magnitude of the level change are stored in the learned level change database 21, and the routine ends.

Of course, the level change information that is stored in the learned level change database 21 need necessarily have been acquired based on learning by the vehicle, and may be acquired from a database that has been created in advance.

Next, setting of the comfort demarcation line will be explained with reference to FIGS. 4-6.

Drivers as users differ in whether or the force (jarring) they experience when their vehicle passes over a level change can be tolerated. For example, one driver may feel discomfort even when this force is weak and thereby feel that the ride comfort is poor, whereas another driver may feel discomfort even when this force is strong and thereby feel that the ride comfort is good. In addition, whether or the force is tolerable may be different even for the same driver depending on the vehicle speed. Generally, it is considered that when the vehicle speed is low, a driver may feel discomfort even when the jarring force is small, whereas when the vehicle speed is high, a driver may feel discomfort even when the jarring force is strong. Thus, in the present embodiment, the preferences of the driver concerning this thrust are learned.

Figure 4:
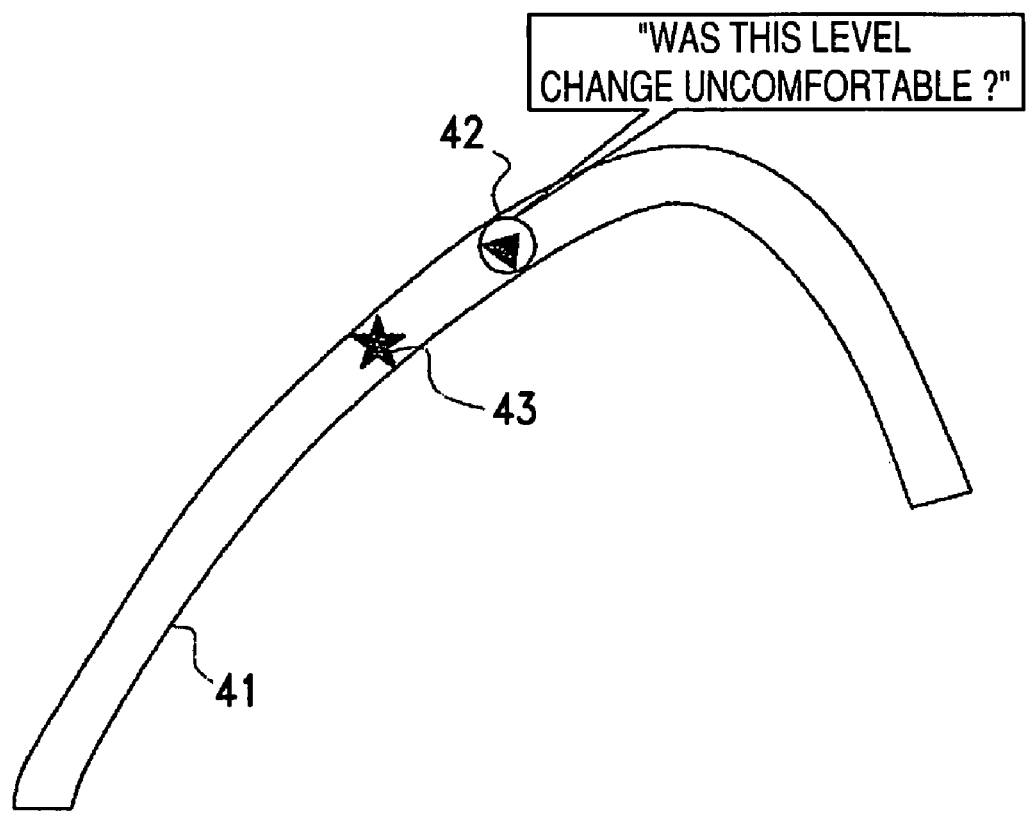
FIG. 4 illustrates learning the preferences of the driver in an embodiment of the present invention.
Figure 5:
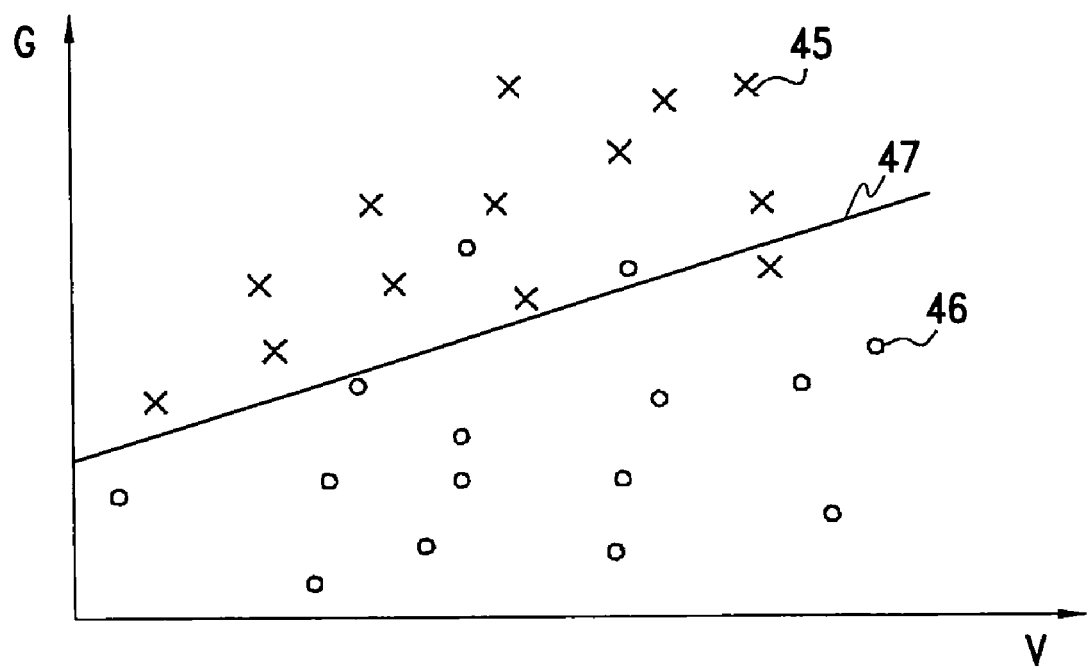
FIG. 5 is a graph illustrating a method of setting the comfort demarcation line, based on the learned preferences of the driver, in the embodiment of the present invention.

In learning, when the navigation apparatus 10 determines that a level change has been detected immediately after the vehicle has passed over the level change, and as shown in FIG. 4, the driver is questioned about the force received. For example, the question "Was this bump uncomfortable?" is displayed on the screen of the display device, and audio is output from an audio output device. In addition, the driver inputs either the response "Uncomfortable" or "Not uncomfortable" by operating an input device such as a touch panel.

In addition, the navigation apparatus 10 stores the response of the driver concerning the level change in the learned driver preference database 23, along with the vehicle speed and the vertical acceleration that were detected while passing over the level change. In this manner, the preference of the driver with respect to the force received from a level change that the vehicle has passed over is learned.

In addition, when a predetermined number or more responses from the driver have been accumulated, the comfort demarcation line that indicates a critical value for the comfort of the driver is set based on the number of accumulated responses of the driver. In this case, as shown in FIG. 5, based on the vehicle speed and the vertical acceleration that have been stored along with the responses, the accumulated responses of the driver are developed into a V-G map, in which the horizontal axis represents the vehicle speed V and the vertical axis represents the vertical acceleration G In FIG. 5, point 45, which is shown as an "x" indicates an "uncomfortable" response, and point 46, which is shown as an "○", indicates a "uncomfortable" response. In addition, a line 47 is set to divide the region in which points 45 are present from the region in which points 46 are present, and this line 47 serves as the comfort demarcation line. The comfort demarcation line 47 is necessarily a straight line, i.e. it may be a curve. However, in the present embodiment, for the convenience of explanation, the comfort demarcation line 47 will be described as a straight line. It is important to note that a comfort demarcation line 47 is not set for every level change, and does depend on the level changes. In other words, the comfort demarcation line 47 is set in relation to the level changes.

Figure 6:
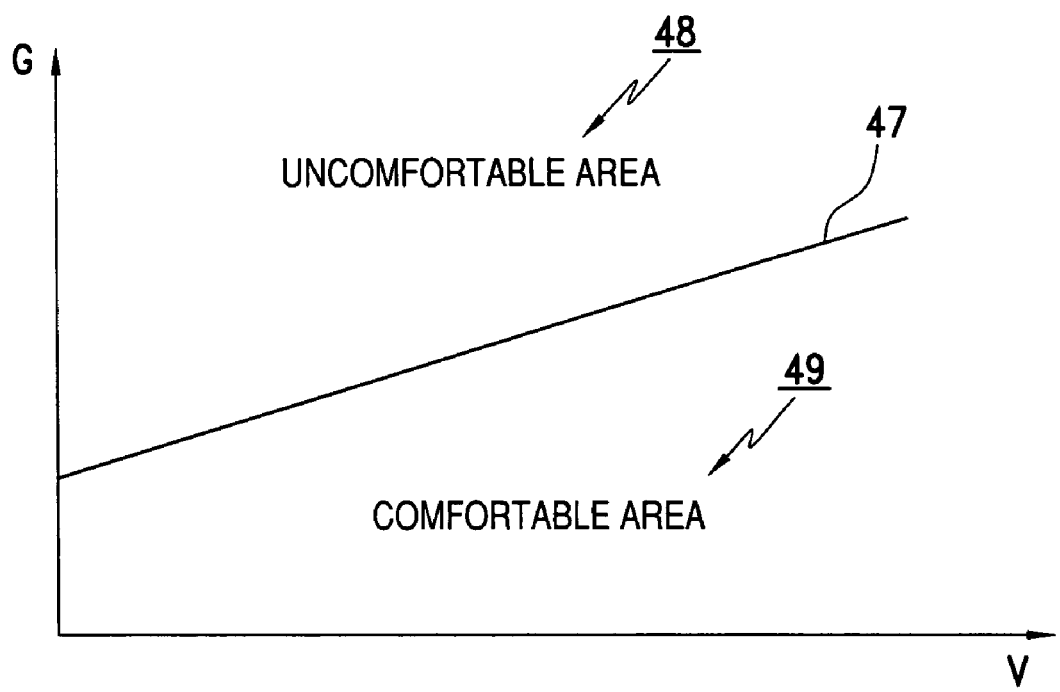
FIG. 6 is a graph illustrating the meaning of the comfort demarcation line in an embodiment of the present invention.

As shown in FIG. 6, the comfort demarcation line 47 is a line that divides the comfort area 49 from the discomfort area 48. The comfort area 49 is the area in which a driver feels no discomfort due to the force received when passing over a level change, that is, the driver feels that the riding comfort is good and comfortable. The discomfort area 48 is the area in which a driver feels discomfort due to the force from a level change, that is, an area in which the driver feels that the riding comfort is inferior and uncomfortable. In other words, the comfort demarcation line 47 is the line that indicates the upper limit value, that is, the critical value of the vertical acceleration that the driver can tolerate as (regard as) being comfortable. Thus, it is understood that if control is executed such that the position on the V-G map, which indicates the relationship between the vehicle speed and the vertical acceleration that have been detected when passing over a level change, remains within the comfort area 49, the driver will feel discomfort due to the force (thrust) received when passing over a level change. In contrast, it is understood that when the position in the V-G map, which indicates the relationship between the vehicle speed and the vertical acceleration, is above the comfort demarcation line 47, i.e. within the uncomfortable area 48, the driver will feel discomfort due to the force received when passing over a level change. Thus, in the present embodiment, suspension control is executed with reference to this comfort demarcation line 47.

The comfort demarcation line 47 used in the suspension control need not necessarily be set based on learning, and can instead be set in advance. For example, it is possible to store in advance and use a comfort demarcation line 47 that has been set based on data from a plurality of vehicles passing over level changes, i.e. by collecting the vehicle speed and vertical acceleration detected at that time along with the responses of the drivers, and developing the collected responses into a V-G map. In this case, while the comfort demarcation line 47 does reflect the preferences of a particular driver, it does reflect the average preferences of multiple drivers.

Next, a method of suspension control in accordance an embodiment of the present invention will be explained with references to FIGS. 7-10.

In the present embodiment, in the case in which a level change is present forward of the vehicle, the amount of control of the suspension is determined based on the vehicle speed V1 at a location immediately before reaching the level change and the magnitude of the level change.

Figure 7:
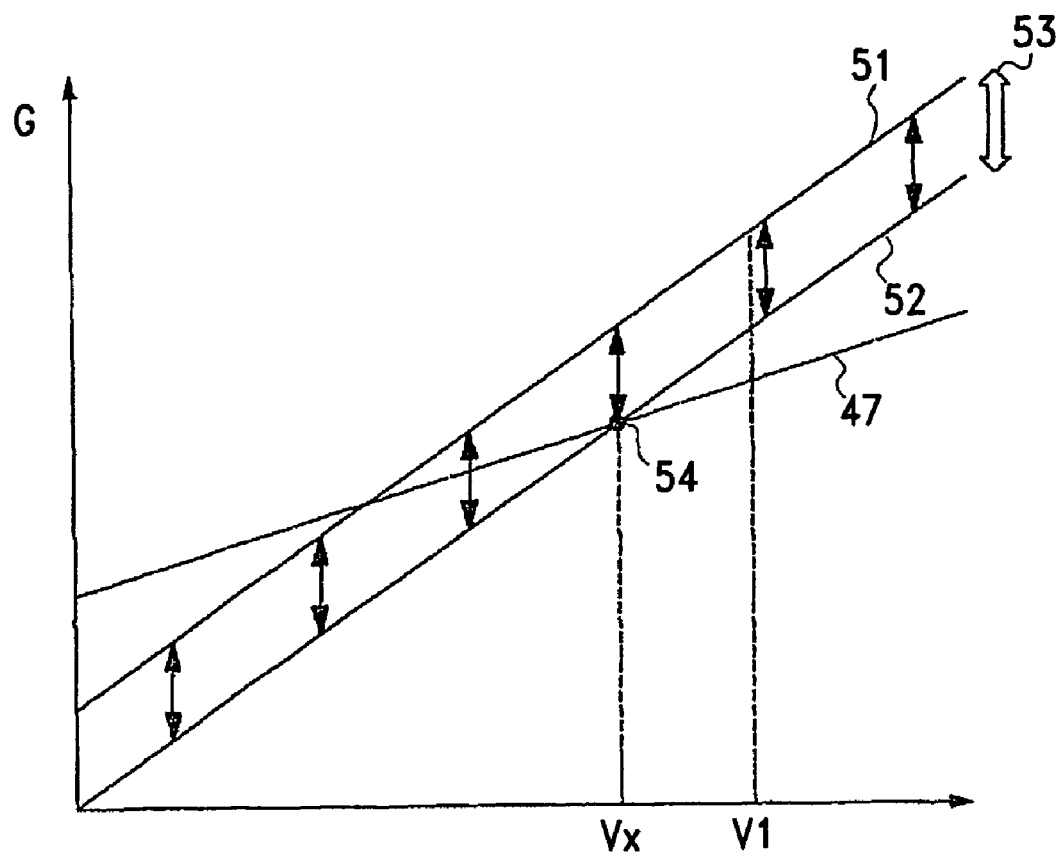
FIG. 7 is a graph of vertical acceleration G versus vehicle speed V showing a comfort demarcation line in one suspension control method in accordance with an embodiment of the present invention.

Here, the characteristic value that indicates the relationship between the vehicle speed V and the vertical acceleration G when the vehicle passes over a level change varies as shown by the straight lines 51 and 52 on the V-G map shown in FIG. 7. Note that the straight line 51 corresponds to the upper limit of the band of variation of this characteristic value, and indicates control of the suspension set to the upper limit where the damping force of the suspension is highest, that is where the suspension is set to be the most firm. The straight line 52 corresponds to the lower limit of the band of variation of the characteristic value, and indicates control of the suspension at the lower limit where the damping force of the suspension is lowest, i.e. is set to be the most soft. The arrow 53 indicates the band within which the vertical acceleration can be varied by controlling the suspension, that is, indicates the band of variation of the characteristic value, whose upper limit and lower limit are defined by the straight lines 51 and 52. In other words, arrow 53 indicates the control band for the available amount of control of the suspension. The intersection 54 between the straight line 52 and the comfort demarcation line 47 is where the vehicle speed corresponding to the intersection 54 is set to Vx. The position and slope of the straight lines 51 and 52 of the V-G map will differ depending on the magnitude of the level change. The vehicle speed while passing over a level change is shown as V1.

As additionally shown in FIG. 7, when V1 is equal to or greater than Vx, within the range equal to or greater than Vx, the line 52 is positioned above the comfort demarcation line 47, and thus it is understood that even if the suspension is set to its softest in order to make the riding comfort satisfactory, a vertical acceleration G having a value that falls within the uncomfortable area 48 will be generated. That is, when V1 is equal to or greater than Vx, even if the suspension is controlled, a vertical acceleration G that causes the driver to feel discomfort will be generated. Thus, in order to minimize the degree to which the driver feels discomfort, in the case where V1 is equal to or greater than Vx, the suspension is set to its softest, and the relationship between the vehicle speed V and the vertical acceleration G is varied along the straight line 52.

Figure 8:
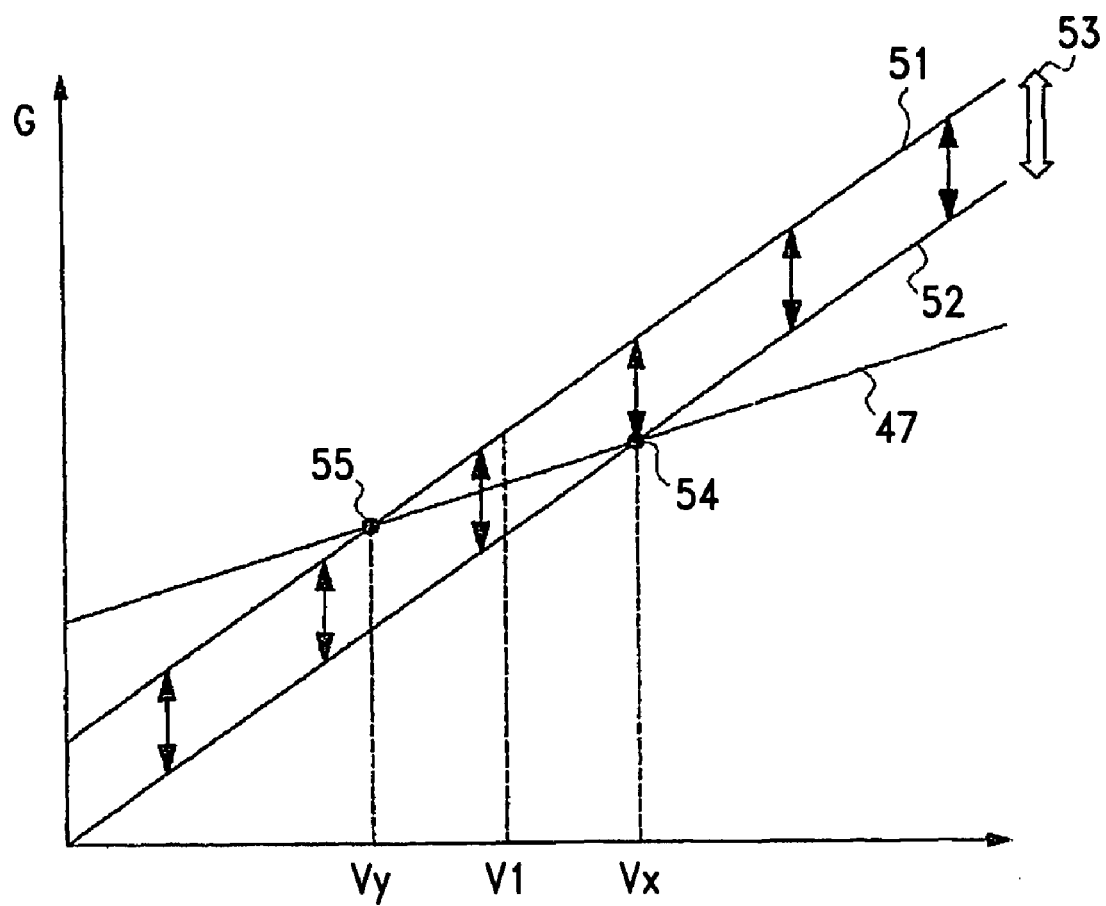
FIG. 8 is a graph of vertical acceleration G versus vehicle speed V showing a comfort demarcation line in another suspension control method in accordance with the present invention.

As also shown in FIG. 8, V1 is set so as to be greater than Vy and less than Vx. Note that Vy is the vehicle speed that corresponds to the intersection 55 between the straight line 51 and the comfort demarcation line 47. In this case, by controlling the suspension, it is possible to set the vertical acceleration G to the critical value for comfort indicated by the comfort demarcation line 47. While it is possible to set the vertical acceleration G lower than the comfort demarcation line 47 in order to make the riding comfort even better, it is desirable to set the suspension more firm in order to increase the travel stability. Thus, in order to harmonize riding comfort and travel stability to a high degree, in the case in which V1 is greater than Vy and less than Vx, the suspension is controlled such that the relationship between the vehicle speed V and the vertical acceleration G is varied along the comfort demarcation line 47.

Figure 9:
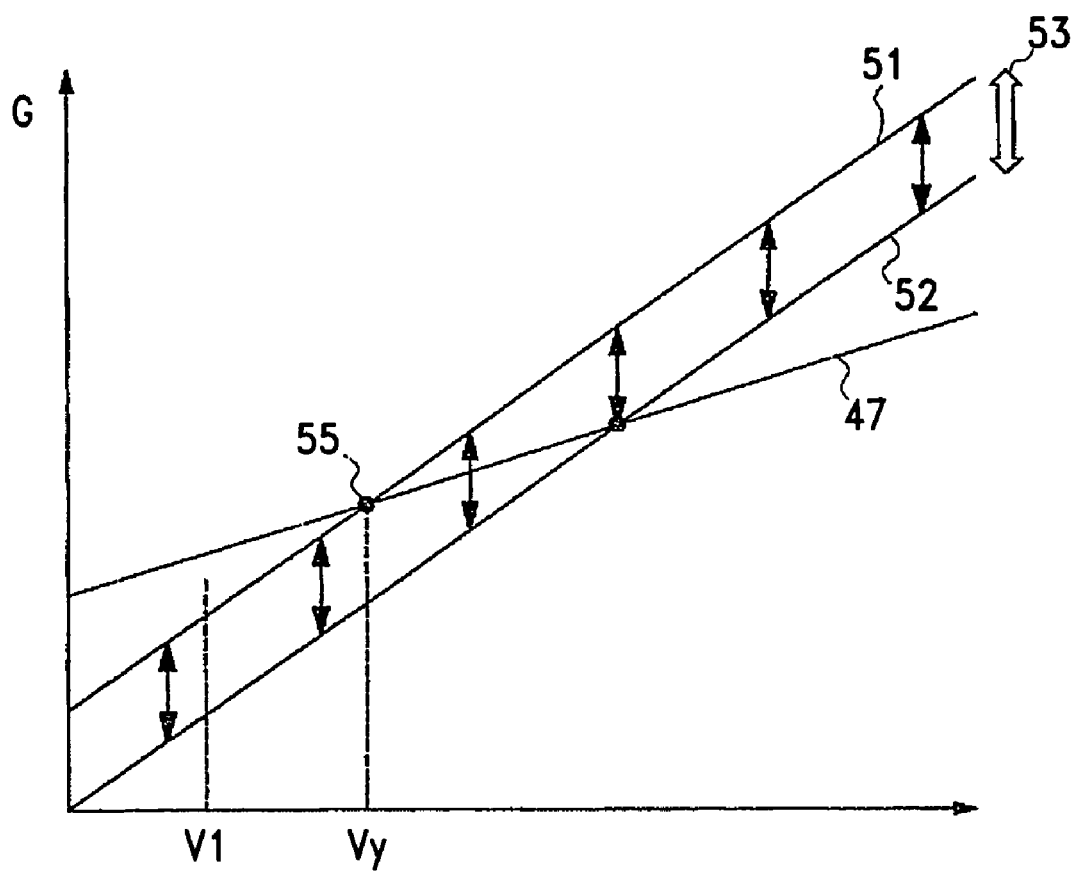
FIG. 9 is a graph of vertical acceleration G versus vehicle speed V for illustration of suspension control with the comfort demarcation line set for firmest suspension control in accordance with an embodiment of the present invention.

Furthermore, as shown in FIG. 9, when V1 is equal to or less than Vy, in the range equal to or less than Vy, the straight line 51 is positioned below the comfort demarcation line 47, and thus even if the suspension is set to its firmest in order to give a high level of travel stability, a vertical acceleration G having a value falling within the comfortable area 49 is generated. That is, when V1 is equal to or less than Vy, with the suspension controlled, the vertical acceleration G will cause the driver to feel discomfort. Thus, in order to maximize travel stability, in the case in which V1 is equal to or less than Vy, the suspension is set to its firmest, and the relationship between the vehicle speed V and the vertical acceleration G is varied along the straight line 51.

Figure 10:
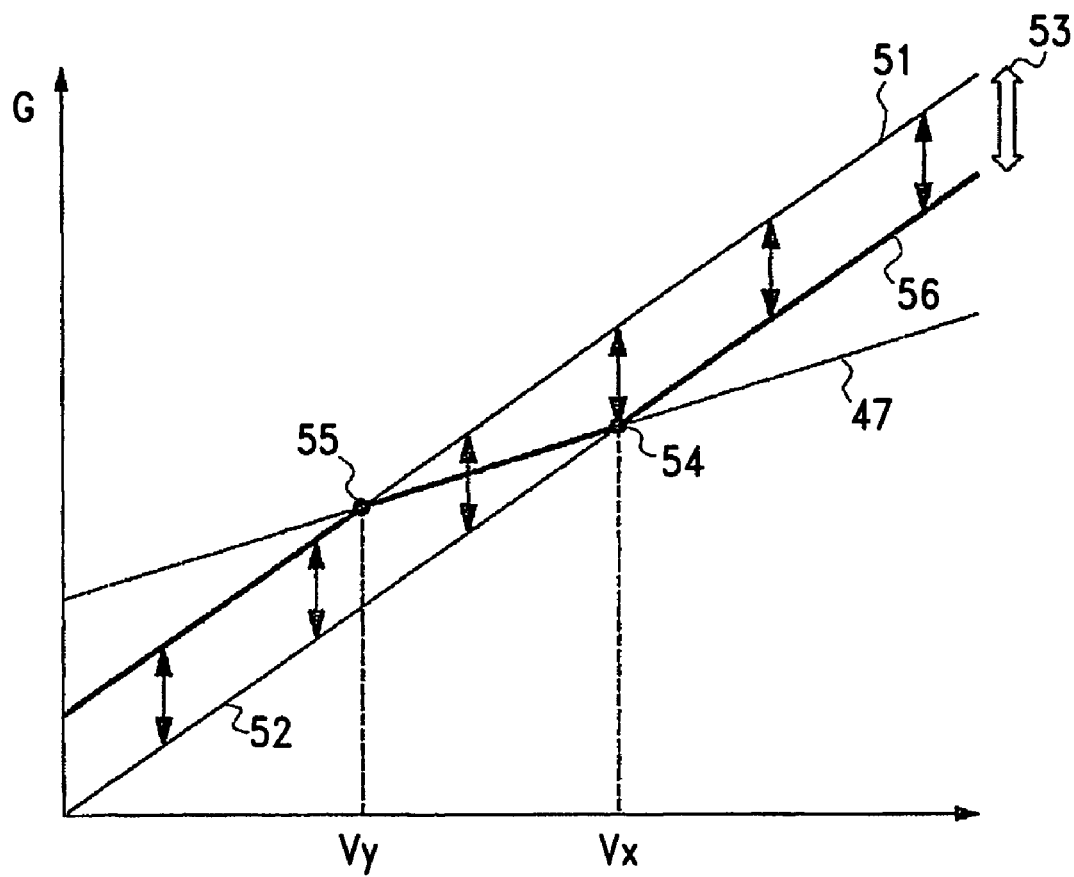
FIG. 10 is a graph of vertical acceleration G versus vehicle speed V showing an optimum control line.

In order to harmonize riding comfort and travel stability, as shown in FIG. 10, it is desirable that the suspension be controlled such that the characteristic value indicating the relationship between the vehicle speed V and the vertical acceleration G changes along the optimal control line 56, indicated in bold. This optimal control line 56 coincides with the straight line 51, which indicates when the suspension is set to its firmest, within a range equal to or less than Vy; coincides with the comfort demarcation line 47 within a range that is greater than Vy and less than Vx; and coincides with the straight line 52, which indicates the suspension set to its softest, within a range that is equal to or greater than Vx. Thus, within the range in which the suspension can be controlled, the optimal control line 56 is the line indicating where the characteristic value is closest to the comfort demarcation line 47. In this manner, it is possible to optimize the riding comfort and the travel stability in line with the preferences of the driver by controlling the suspension such that the relationship between the vehicle speed V1 and the vertical acceleration G varies along the optimal control line 56, that is, the relationship between the vehicle speed V1 and the vertical acceleration G is close to the comfort demarcation line 47.

Next a method for controlling the vehicle speed will be explained with reference to FIGS. 11-13.

As has been explained above, even with suspension control when the vehicle speed V is equal to or greater than Vx, the vertical acceleration G will cause the driver to feel discomfort. Thus, in the present embodiment, when the vehicle speed V is equal to or greater than Vx, the vehicle speed is decreased so as to reach Vx by deceleration control using engine braking.

Figure 11:
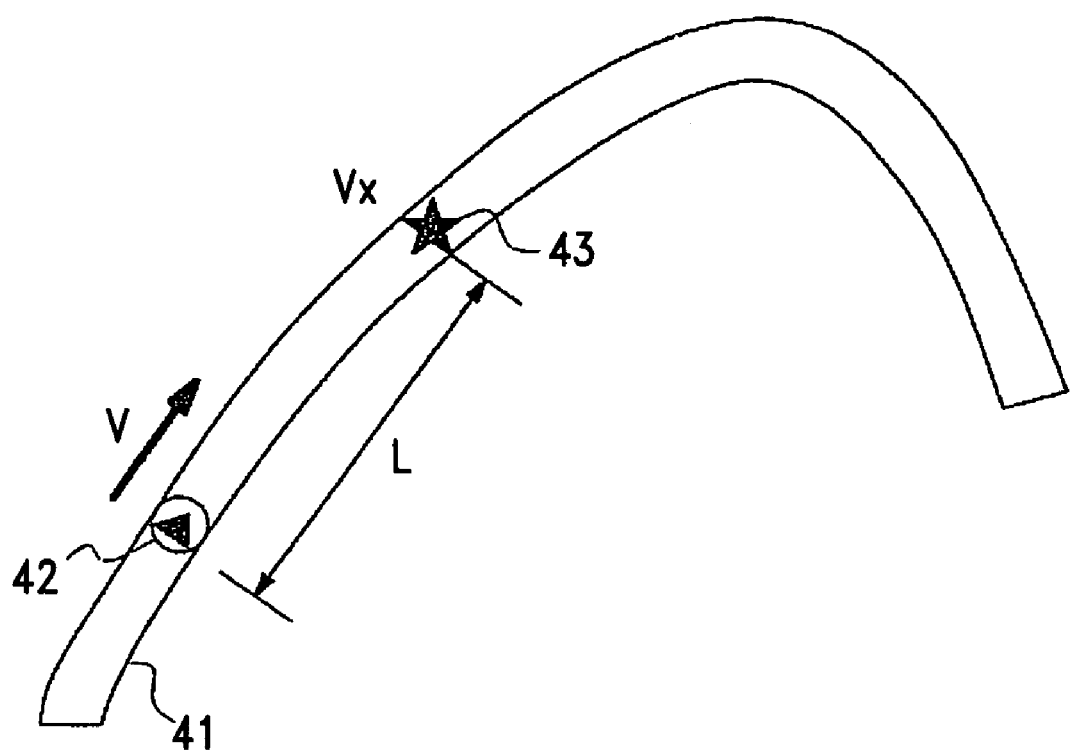
FIG. 11 illustrates deceleration of the vehicle before reaching a level change in accordance with an embodiment of the present invention.

As shown in FIG. 11, when the navigation apparatus 10 determines that there is a level change forward of the vehicle and determines that the current vehicle speed V is equal to or greater than Vx, deceleration control is carried out by setting Vx to a target vehicle speed. Note that the distance from the current location of the vehicle to the level change is denoted by "L".

In this case, the target deceleration calculating section 14 calculates the necessary deceleration "Gv" according to the following equation (1):

$$Gv=(V^2-Vx^2)/(2\times L) \hspace{2cm} \text{Equation (1)}$$

Figure 12:
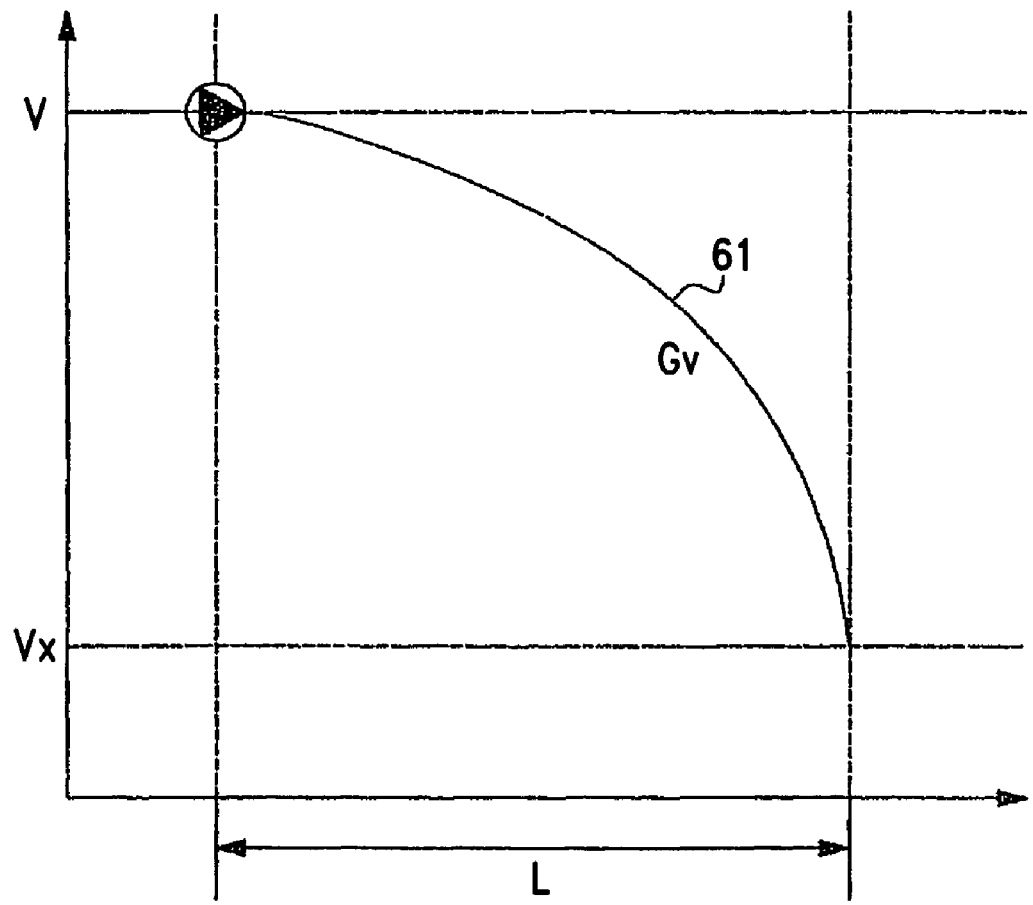
FIG. 12 illustrates calculation of the necessary deceleration in accordance with an embodiment of the present invention.

The calculated necessary deceleration Gv is shown by a curve 61 in the graph of FIG. 12 in which the horizontal axis represents the distance and the vertical axis represents the vehicle speed. The curve 61 in FIG. 12 shows the variation in the vehicle speed corresponding to the calculated necessary deceleration, and shows that as the curvature of the curve 61 becomes larger, that is, as the shape of the curve becomes tighter, the necessary deceleration becomes larger.

Figure 13:
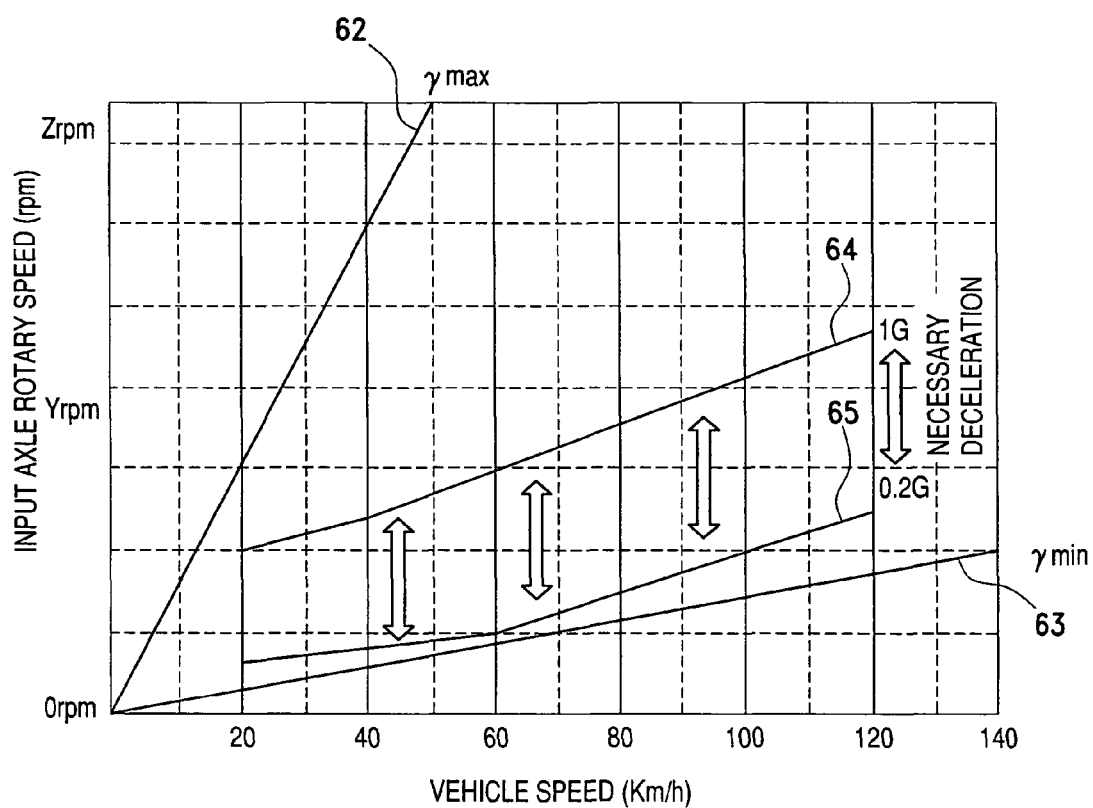
FIG. 13 is a map stored in memory for use in determining a target rotary speed for the automatic transmission in an embodiment of the present invention.

The vehicle speed changing section 33 controls the automatic transmission according to the map shown in FIG. 13 to attain the necessary deceleration calculated by the target deceleration calculating section 14. The automatic transmission in this embodiment is a continuously variable transmission having pulleys and shifting by changing the pulley ratio.

The map shown in FIG. 13 is a shift map for the automatic transmission, wherein the horizontal axis represents the vehicle speed and the vertical axis represents the input axle rotary speed. The straight line 62 indicates the relationship between the input axle rotary speed and the vehicle speed when the gear ratio of the automatic transmission is set to its maximum. The straight line 63 indicates the relationship between the input axle rotary speed when the gear ratio of the automatic transmission is set to its minimum. Note that the vehicle speed is proportional to the output axle rotary speed.

The curved lines 64 and 65 in FIG. 13 are shift curves that indicate the relationship between the target input axle rotary speed, which corresponds to the necessary deceleration, and the vehicle speed. The curved line 64 corresponds to the case in which the necessary deceleration is 1 (G) and the curved line 65 corresponds to the case in which the necessary deceleration is 0.2 (G). If the necessary deceleration is between 0.2 (G) and 1 (G), a value between the curved line 64 and the curved line 65 is selected. Thus, a target input axle rotary speed that corresponds to the necessary deceleration calculated by the target deceleration calculating section 14 may be determined. As shown in FIG. 13, as the necessary deceleration becomes larger, the target input axle rotary speed becomes higher. As the gear ratio of the automatic transmission increases as the target input axle rotary speed becomes higher, engine braking acts strongly when the accelerator is closed, and the vehicle thereby decelerates rapidly.

Thus, the closing of the accelerator determines that the driver intends to decelerate, and thus the vehicle speed changing section 33 determines the target gear ratio for attaining the necessary deceleration as calculated by the target deceleration calculating section 14. This target gear ratio is calculated according to the following equation (2):

(Target gear ratio)=(Target input axle rotary speed)/(Output axle rotary speed)  Equation (2)

The output axle rotary speed is proportional to the vehicle speed, and thus is found from the vehicle speed calculated by the vehicle speed detecting means (or "section") 32.

The vehicle speed changing means 33 controls the pulley ratio of the automatic transmission such that the gear ratio matches the calculated target gear ratio.

Figure 14:
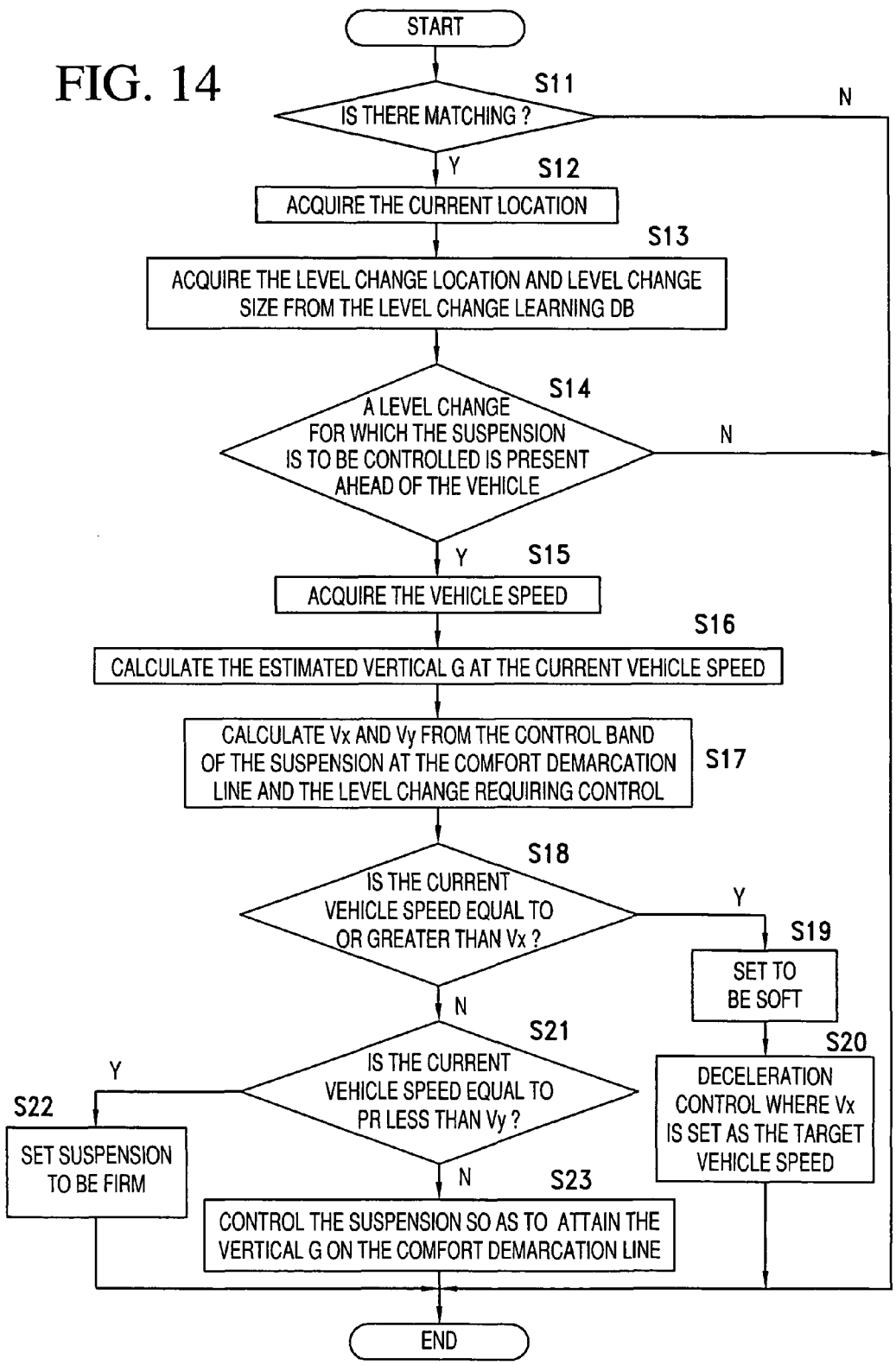
FIG. 14 is a flowchart of a method for vehicle suspension control (suspension control routine) in accordance with an embodiment of the present invention.

Next, the operation by which the suspension and the automatic transmission are controlled while the vehicle is traveling (suspension control routine) will be explained with reference to FIG. 14.

The navigation apparatus 10 first determines whether there is matching. In this case, the current location determination section 11 compares the current location of the vehicle that has been detected based on signals from the GPS sensor, the gyroscopic sensor, the G sensor, the vehicle speed detecting means 32 or the like, with the map data that is stored in the map database 22, i.e. map matching. When the detected current location of the vehicle is found to be on a road in the map data, it is determined that there is no matching and the routine is ended.

For a given level change, the navigation apparatus 10 calculates the estimated extent to which vertical acceleration can be reduced by controlling the suspension, based on the magnitude of the level change, and calculates Vx and Vy from the comfort demarcation line and the calculated estimated vertical acceleration. In this procedure, the suspension control band is obtained for the level change forward of the vehicle. In the suspension control band, the upper limit and the lower limit are determined by the straight lines 51 and 52 on the V-G map, as shown in FIG. 7 to FIG. 10. Then, the values of the vehicle speeds Vx and Vy, which correspond to the intersections 54 and 55 between the straight lines 51 and 52 and the comfort demarcation line 47 on the V-G map described above, are calculated.

The navigation apparatus 10 then determines whether or the current vehicle speed is equal to or greater than Vx. Specifically, it is determined whether or the estimated vertical acceleration at the current vehicle speed is larger than the vertical acceleration on the comfort demarcation line that corresponds to this current vehicle speed. When the current vehicle speed is equal to or greater than Vx, the suspension is set to be soft and execution of the control routine is ended. The control band for the suspension is obtained for the level change present ahead of the vehicle. The upper limit and the lower limit of this suspension control band are determined by the straight lines 51 and 52 on the V-G map, as shown in FIG. 7 to FIG. 10. Then the vehicle speeds Vx and Vy, which correspond to the intersections 54 and 55 between the straight lines 51 and 52 and the comfort demarcation line 47 on the V-G map described above, are calculated.

Next, the navigation apparatus 10 determines whether or the current vehicle speed is equal to or greater than Vx. When the current vehicle speed is determined to be equal to or greater than Vx, the suspension is set to be soft, deceleration control is carried out with Vx serving as the target vehicle speed, and the routine is ended. The optimal damping force calculating section 13 calculates the minimum damping force and sends the results to the suspension ECU 31. When this has been done, the suspension ECU 31 controls the suspension to attain the damping force calculated by the optimal damping force calculating section 13 thereby setting the suspension to its softest. In addition, the target deceleration calculating section 14 calculates the necessary deceleration according to Equation (1) above and sends the results to the vehicle speed changing means 33. When this has been done, the vehicle speed changing means 33 controls the pulley ratio of the automatic transmission to attain the necessary deceleration calculated by the target deceleration calculating section 14. In this manner, because the vehicle speed has reached Vx when the vehicle passes over the level change, the driver feels no discomfort.

When the current vehicle speed is equal to or greater than Vx, the navigation apparatus 10 determines whether or the current vehicle speed is equal to or less than Vy. Then, in the case in which the current vehicle speed is equal to or less than Vy, the suspension is set to be firm and the control routine ends. In this case, the optimal damping force calculating section 13 calculates the highest damping force and sends the result to the suspension ECU 31. In response, the suspension ECU 31 controls the suspension so as to attain the damping force that has been received from the optimal damping force calculating section 13 and the suspension is set to its firmest.

When the current vehicle speed is equal to or less than Vy, the suspension is controlled so as to attain a vertical acceleration on the comfort demarcation line, and the routine is ended. The optimal damping force calculating section 13 calculates the damping force corresponding to the vertical acceleration indicated by the comfort demarcation line and sends the result to the suspension ECU 31. The suspension ECU 31 then controls the suspension so as to attain the calculated damping force. In this manner, the suspension is controlled such that the relationship between the vehicle speed and the vertical acceleration is changed (varied) along the comfort demarcation line.

The control process (routine) described above is repeatedly executed at a predetermined timing interval, for example, once every 10 msec.

Next, the flowchart of FIG. 14 will be explained.

Step S11: It is determined whether or there is map matching. When there is map matching, the routine proceeds to step S12, and when there is no map matching, the routine (control process) terminates.

Step S12: The current location is obtained.

Step S13: The level change locations and the level change magnitudes are obtained from the learned level change database 21.

Step S14: It is determined whether or a level change is present forward of the vehicle and indicates need for suspension control. When there is a level change forward of the vehicle requiring suspension control, the routine proceeds to step S15, and when there is no level change present forward of the vehicle requiring suspension control, the routine terminates.

Step S15: The vehicle speed is obtained.

Step S16: The estimated vertical acceleration G at the current vehicle speed is calculated.

Step S17: Vx and Vy are calculated from the comfort demarcation line and the suspension control band at the level change requiring control.

Step S18: It is determined whether or the current vehicle speed is equal to or greater than Vx. When the current vehicle speed is equal to or greater than Vx, the routine proceeds to step S19, and when the current vehicle speed is equal to or greater than Vx, the routine proceeds to step S21.

Step S19: The suspension is set to be soft.

Step S20: Deceleration control is carried out with Vx serving as the target vehicle speed, and the routine terminates.

Step S21: It is determined whether or the current vehicle speed is equal to or less than Vy. When the current vehicle speed is equal to or less than Vy, the routine proceeds to step S22, and when the current vehicle speed is equal to or less than Vy, the routine proceeds to step S23.

Step S22: The suspension is set to be firm, and the routine terminates.

Step S23: The suspension is controlled so as to attain the vertical acceleration on the comfort demarcation line, and the routine terminates.

In foregoing manner, in the present embodiment, when the characteristic value, indicating the relationship between the speed and the vertical acceleration of the vehicle, exceeds the comfort demarcation line that indicates the critical value for comfort, that is, when the estimated vertical acceleration G at the current vehicle speed is larger than the vertical acceleration of the critical value corresponding to the current vehicle speed, deceleration control is executed. Specifically, in the case in which the vehicle speed is equal to or greater than Vx, the suspension is set to be soft, and at the same time, the gear ratio of the automatic transmission is controlled for deceleration of the vehicle to attain Vx. Thus, even when the initial vehicle speed is high, the vehicle decelerates before reaching the level change and the vehicle speed attains Vx when passing over the level change. Thus, riding comfort is maintained for the driver.

When the vehicle speed is equal to or less than Vy, the suspension is set to be firm, and when the vehicle speed is greater than Vy and less than Vx, the suspension is controlled so as to attain a vertical acceleration on the comfort demarcation line. Thus, it is possible to optimize the riding comfort and the travel stability in line with the preferences of the driver.

Furthermore, the level changes that the vehicle passes over during travel are learned, and level change information that includes the location of the level change, the magnitude (size) of the level change, and the like is accumulated. Thereby, it is possible to correctly detect level changes in the road in subsequent travel on the same road.

In the foregoing description of preferred embodiments, only control of the damping force of the suspension is explained. However, the present invention can be applied in embodiments wherein the damping force of the suspension is controlled. In this case, the characteristic value indicating the relationship between the speed and the vertical acceleration of the vehicle may be a straight line, which is analogous to the straight lines 51 and 52, but which does vary in a band having the width represented by the area between the straight lines 51 and 52 as shown in FIG. 7. In such a modification, when the characteristic value that varies along this straight line exceeds the comfort demarcation line 47 and when the vehicle decelerates to the vehicle speed that corresponds to the intersection between this straight line and the comfort demarcation line 47 during deceleration control, the characteristic value remains within the comfort area 49, under the comfort demarcation line 47, thus maintaining riding comfort for the driver even without control of the damping force of the suspension.

The invention may be embodied in other specific forms without departing from the spirit or essential characteristics thereof. The present embodiments are therefore to be considered in all respects as illustrative and restrictive, the scope of the invention being indicated by the appended claims rather than by the foregoing description, and all changes which come within the meaning and range of equivalency of the claims are therefore intended to be embraced therein.

What is claimed is:

1. A vehicle control system, comprising:
   a memory device that stores level change information including location and magnitude of level changes on a road;
   a vehicle speed detecting device that detects the speed of a vehicle;
   a current location determination device that determines the current location of the vehicle; and
   a navigation device configured to determine if the vehicle is approaching a level change, based on the current location of the vehicle determined by the current location determination device and the location of level changes stored in the memory device, and to calculate, when a determination is made that the vehicle is approaching a level change an estimated vertical acceleration based on the speed of the vehicle detected by the vehicle speed detecting device and the magnitude of the level change stored in the memory device; and
   a vehicle speed changing device that executes deceleration control when the calculated estimated vertical acceleration is larger than a vertical acceleration predetermined for driver comfort at the speed of the vehicle detected by the vehicle speed detecting device.

2. The vehicle control system according to claim 1, wherein predetermined values for driver comfort are stored in the memory device as a comfort demarcation line set so as to divide on a map an area in which riding comfort is maintained even when the vehicle passes over a level change and an area in which discomfort is felt when the vehicle passes over a level change, the coordinate axes of the map being the speed and the vertical acceleration of the vehicle.

3. The vehicle control system according to claim 2, wherein an area in which comfort is felt and an area in which discomfort is felt are areas that are set based on preferences of a user with respect to the force received from a level change that the vehicle has passed over.

4. The vehicle control system according to claim 2, further comprising:
   a level change control device that executes level change control to vary a control parameter based on the level change information about level changes that is stored in the memory device; and
   wherein the level change control device varies the control parameter such that the vertical acceleration varies according to the comfort demarcation line.

5. The vehicle control system according to claim 4, wherein the level change control device varies the control parameter along the comfort demarcation line within a speed range in which an upper limit of a band of fluctuation of the vertical acceleration is higher than the comfort demarcation line and a lower limit of the band of fluctuation of the vertical acceleration is lower than the comfort demarcation line, the upper limit and the lower limit defining a control band therebetween.

6. The vehicle control system according to claim 5, wherein:
   the level change control device sets the control parameter to the upper limit of the control band in a speed range in which the upper limit of the band of fluctuation of the vertical acceleration is set equal to or less than the comfort demarcation line; and
   the level change control device sets the control parameter to the lower limit of the control band in a speed range in which the lower limit of the fluctuation band of the vertical acceleration is equal to or greater than the comfort demarcation line.

7. The vehicle control system according to claim 4 wherein the level change control device controls a suspension system of the vehicle and wherein the control parameter is the damping force of the suspension system.

8. The vehicle control system according to claim 5, wherein the vehicle speed control device executes deceleration control in a speed range in which the lower limit of the fluctuation band of the vertical acceleration is set equal to or greater than the comfort demarcation line.

9. The vehicle control system according to claim 8, wherein the vehicle speed control device executes deceleration control by varying the gear ratio of an automatic transmission.

10. The vehicle control system according to claim 6, wherein the vehicle speed control device executes deceleration control in a speed range in which the lower limit of the fluctuation band of the vertical acceleration is set equal to or greater than the comfort demarcation line.

11. The vehicle control system according to claim 10, wherein the vehicle speed control device executes deceleration control by varying the gear ratio of an automatic transmission.

* * * * *